United States Patent Office

2,786,874
Patented Mar. 26, 1957

2,786,874

CARBON AND FLUORINE-CONTAINING POLYMER

Wilber O. Teeters, River Edge, Russell M. Mantell, Orange, and Herbert J. Passino, Englewood, N. J., assignors to The M. W. Kellogg Company, Jersey City, N. J., a corporation of Delaware No Drawing. Application November 19, 1951, Serial No. 257,171

4 Claims. (Cl. 260—653)

This invention relates to a novel solid composition containing the elements of halogen and carbon, and also relates to a novel method of preparing such a material.

An object of this invention is to provide a novel solid composition containing the elements halogen and carbon.

Another object of this invention is to provide a novel method for preparing a solid composition containing the elements of halogen and carbon.

Still another object is to provide a novel composition and novel method for making same by means of a fluid system.

Other objects and advantages of this invention will become apparent as the description proceeds.

By means of the present invention, it is contemplated preparing a solid composition containing the elements halogen and carbon by the method comprising the reaction of fluorine with carbon in the presence of a halogen other than fluorine under suitable conditions. The halogen other than fluorine is employed in relatively small amounts and serves to facilitate the reaction between the carbon and fluorine, which otherwise proceeds too rapidly for proper control. A particular mode of operation is to suspend a mass of finely divided carbon particles in an inert gas to form a fluid bed which is unusually well adapted for the reaction with the reactant gas.

In another aspect of this invention, a novel solid composition is provided which comprises the elements halogen and carbon. The novel solid may be represented by the following formula:

$$(CF_n)_x$$

wherein C and F represent the elements carbon and fluorine. The subscript $n$ is an integer representing the ratio of fluorine to carbon, taking the carbon to be one. The subscript $x$ is the number of $CF_n$ units occurring in a single molecule of high molecular weight.

In the solid composition, there may be present very small amounts of a halogen other than fluorine. The small concentration of halogen other than fluorine indicates that it is not part of a definite scheme or pattern of the desired solid composition, but that it may be sorbed material, or combined halogen in a low molecular weight compound which is sorbed in the desired solid composition. As will be noted hereinbelow, this halogen seldom exceeds about  1.5% by weight of the final composition, and it varies with successive steps of treatment without any apparent reason other than it is present as an impurity.

In the formula given above, the subscript $n$ may vary over a wide range, depending upon the conditions of reaction, e. g., notably time. The lowest value for $n$ can be just above zero and it can be as high as 3.0. When the concentration of fluorine is low the color of the solid is dark and the color becomes lighter as the halogen content is increased. This continues until the solid becomes white in color. The unusual characteristic of the solid is its stability at elevated temperatures. For example, a particular solid was exposed to heat by gradually increasing the temperature, and at about 500° C. it decomposed. Another interesting phenomenon is that by X-ray analysis it was found that a solid containing about 61% by weight of fluorine has an amorphous structure, whereas a solid containing more than about 61% fluorine, e. g., about 79% fluorine has a crystalline structure. The solid containing about 61% fluorine very closely approximates a material having a one to one atomic ratio of carbon to fluorine, because such a material theoretically contains 61.3% by weight of fluorine.

The solid material of this invention can serve many useful purposes because of its unique properties. Some uses are, for example, as a filler for the polymers of chlorotrifluoroethylene, tetrafluoroethylene, etc., or arctic rubber, an insecticide, a rocket-fuel ingredient, etc. The solid material is a polymer and thus it can be used for many of the known uses of such materials.

In order to obtain the solid composition, fluorine and a halogen other than fluorine, e. g., chlorine, bromine or iodine or mixtures of two or more thereof are employed in a ratio of the former to the latter of about 100 to 1:1, preferably about 10 to 20:1. The halogen other than fluorine is used in small quantities which appear to facilitate the formation of the novel solid material. At the start of the reaction with carbon, low and high boiling halocarbons may be produced, however, thereafter the production of such materials substantially ceases and the increase in halogen content of the solid material appears to be the only significant occurrence. The carbon reactant can be used in any physical form which is desired for a particular operation and this includes lumps, pellets, granules and finely divided particles. In these physical states, the carbon is employed in excess of that required to react with all of the halogen present. The excess of carbon is desired, because it affords a means of controlling the temperature of reaction. Fluorine is highly reactive with carbon, and by maintaining the concentration low, relative to carbon, complete consumption or reaction of fluorine is obtained as well as better control of the heat which is liberated. Ordinarily, about .001 to 1.0 cubic feet of fluorine (measured at 60° F. and 760 mm.) per minute per pound of carbon, preferably about .01 to 0.1 cubic feet (60° F. and 760 mm.) per minute per pound of carbon are used.

The carbon can be used in a granular form in which the particles are about 0.1 to 10 mm. in size. However, the best results are obtained by using powdered carbon which has a particle size of about 5 to 250 microns, more usually, about 10 to 100 microns. In the powdered state, the carbon can be fluidized to produce either a lean or dense bed or phase by passing the reactant gases upwardly through such a mass. Fluidization is accomplished generally by passing the gases at a linear velocity of about 0.1 to 50 feet per second, more usually, about 0.1 to 6 feet per second, preferably about 1 to 2.5 feet per second, measured under superficial conditions by assuming that the gas is the only material in the vessel. The selection of a superficial linear velocity will depend on the particle size and particle density for obtaining a desired fluid bed density. The particle density varies with the source of carbon material, which in the present case includes carbon from any source just so long as it is substantially free of hydrogen. Hydrogen reacts with the halogen and causes the formation of undesirable by-products. The carbon may be derived from wood or sugar charcoals, coke, graphite, etc.

A fluid system is unusually adapted for the reaction of carbon with fluorine to produce the novel solid material. The presence of a halogen other than fluorine under reaction conditions results in the unexpected advantages to be shown hereinafter. However, the fluid system is also applicable to reacting carbon with fluorine to produce solid material, without the presence of a halogen other than fluorine; although the method involving the use of a halogen other than fluorine is preferred. Significantly, in the reaction between carbon and fluorine without the presence of another halogen, it may be desirable, although not essential, to employ a catalytic material, viz., an inorganic metal halide in order to facilitate the reaction. On the other hand, the presence of a halogen other than fluorine in the reaction provides a method which functions effectively without the use of a catalytic material.

For some situations, it is preferred to employ reactant gases in quantities which are insufficient to produce adequate fluidization of the carbon particles. Thus, to obtain a fluid system, it is necessary to employ an additional inert fluid in the reaction system. This inert fluid, e. g., gas, can serve the two-fold purpose of (1) properly fluidizing the carbon and (2) as a means of cooling the reaction temperature. In the latter respect, the gas should preferably contain a high specific heat in order that excessive quantities be avoided. The inert gas is a fluid which is substantially inert under reaction conditions and it may be, for example, helium, nitrogen, carbon dioxide, etc. When desirable, it is employed in a quantity of about 100 to 1, preferably about 20 to 1, cubic feet (60° F. and 760 mm.) per cubic foot of fluorine.

The reaction between carbon and the reactant gaseous material may be conducted at a temperature varying over a wide range. Generally, a temperature of about 200° to 900° F. is suitable, although it is preferred to use a temperature of about 500° to 700° F. A preferred procedure for carrying out the reaction is to use initially a temperature of about 200° to 400° F. in order to control more effectively any unusual heat effects. After the reaction has been in progress for about 5 to 10 hours, the temperature is raised to about 500° to 700° F. and is allowed to remain at this level for the entire operation. It was discovered that at the start of the reaction, gaseous and/or liquid halocarbons were produced, accompanied by the liberation of a large amount of heat. After the reaction has been in progress for a while, the production of volatile halocarbons substantially ceases. Accordingly, the above described preferred procedure of operation tends to overcome any undesirable heat effects which might occur during the initial period of reaction. The pressure of the reaction can also be varied to include operations under sub-atmospheric, atmospheric or super-atmospheric pressure. Generally, the reaction pressure is about ½ to 10 atmospheres, preferably about 1 to 2 atmospheres.

In some instances, it is desirable to employ a catalytic material for the production of the novel solid material. The catalytic material is an inorganic metal halide and includes the fluorides, chlorides, bromides or iodides of any metal. Catalysts which are particularly suited for the reaction include, for example, the halides of copper, silver or gold in group I; the halides of zinc, cadmium or mercury in group II; the halides of iron, cobalt or nickel in group VIII; etc. More specific examples are copper chloride, zinc chloride, cobalt fluoride, iron bromide, silver chloride, mercury iodide, etc. To derive beneficial effects from a catalytic material, about 0.1 to 12%, based on the weight of carbon, is used. However, it is preferred to employ about 8 to 12% of inorganic metal halide, because better results are to be expected therefrom.

In order to more fully describe the present invention, specific illustrations thereof are given below.

Experiments were conducted on a laboratory scale in order to evaluate the conditions under which the reaction between carbon and fluorine should be conducted. The apparatus employed for this purpose consisted of a Monel reactor having a diameter of approximately 1 inch and being about 36 inches long. A small settling chamber, 6 inches in length and approximately 4 inches in diameter, was superimposed on the reactor tube and contained a cylindrical, porous, sintered, Monel filter for the removal of entrained carbon particles from the effluent gaseous material. The filter was about 5 inches long and about 2 inches in diameter. Concentrically disposed within the filter was a Monel thermowell. This thermowell was approximately ¼ inch in diameter and 34 inches in length. The thermowell contained an iron-constantan thermocouple of 36 inches in length. Within the bottom of the reactor there was provided a support consisting of a Monel ring, upon which there rested a Monel tube having the outside diameter slightly smaller than the internal diameter of the reactor and having a length of 1 inch. The Monel tube was filled with a roll of 100 mesh nickel gauze. The nickel gauze permitted gases to pass therethrough and distribute uniformly across the cross-sectional area of the reactor. It also served as a means for supporting the bed of carbon particles in the reactor. Also, on the support, there was fixed a ¼" x 4" Monel sleeve, in which the bottom end of the thermowell fitted. This afforded a means of centering the thermowell in the reactor. The filter situated within the settling chamber was connected externally to a Pyrex, internal cold-finger, liquid nitrogen trap having a 4 inch diameter and a 20 inch length. The liquid nitrogen trap was connected to a Pyrex, graduated, Podbielniak distillation kettle of a 50 mm. capacity. The kettle was maintained in a cooled condition by means of a dewar containing liquid nitrogen. Heat was supplied to the reactor by external means through a 2500 watt electric jacket surrounding the same. Fluorine and inert gas were supplied to the bottom of the reactor by means of lines which were connected to suitable rotameters for measuring gas rates. At the top of the reactor there was installed a suitable gauge for measuring the reaction pressure. In all the experiments performed, the reaction pressure was maintained at atmospheric level.

In the laboratory equipment described above, initial experiments were conducted to determine the nature of the reaction between a fluorine-chlorine gas mixture and carbon for the production of a solid material containing the elements carbon and halogen. These results are reported in Table I below.

TABLE I

| Ex. No. | Temp., °F. | Time, Hrs. | Charge | Weight of Charge, gm. | $F_2$, Ft.³/min. | $Cl_2$, Ft.³/min. | He, Ft.³/min. | Residue, gm. | Percent F Residue | Percent Cl Residue | H. B.², gm. | Gas, gm. |
|---|---|---|---|---|---|---|---|---|---|---|---|---|
| 1 | 600 | 5½ | Leached Norite.¹ | 50 | .005 | .00025 | .02 | | | | 6.2 | 10.2 |
| 2 | 600 | 6 | Ex. 1 | | .005 | .00025 | .02 | | | | 3.7 | 0.3 |
| 3 | 600 | 5 | Ex. 2 | | .005 | .00025 | .02 | 90–95 | 67.6 | 0.4 | Trace | Trace |

¹ Norite is leached with a boiling aqueous solution of HCl, and then washed thoroughly with water. This removes impurities such as iron, etc. The charge was 40–100 mesh size.
² H. B. are liquid halocarbons containing at least 5 carbon atoms.

It is to be noted from Table I that initally liquid and gaseous halocarbons are produced from the reaction, but as the operation continues the yields of liquid and gaseous halocarbons decrease and finally only a trace thereof is obtained. In the meantime, the carbon continues to combine with the halogen to yield the desired solid material, until this reaction is substantially the only one taking place. The residue obtained contains a high percentage of fluorine, viz., 67.6 weight percent and a small amount of chlorine, i. e., 0.4 weight percent. This solid contains more fluorine than is found in those solid compositions wherein the atomic ratio of carbon to fluorine is one to one.

The stability of the solid composition obtained in accordance with this invention was tested by attempting to rupture the carbon to carbon bonds in the molecules. This was attempted by using elevated temperatures and chlorine without fluorine. These results are shown in Table II below.

material is preferred as the reactant, because it offers more surface area for contact with the reactant gases and perhaps provides better contact by reason of the gases being sorbed on the surface of the carbon material. From Examples 2–5, inclusive, it is to be noted that the residue or solid material continuously increases in fluorine content, whereas the total weight of the material remains essentially the same after the initial gain in weight resulting from the first six hours of operation.

Additional experiments using leached Norite were made for the purpose of comparison with the results from

TABLE II

| Ex. No. | Temp., °F. | Time, Hrs. | Charge | Weight of charge, gm. | $F_2$, Ft.$^3$/min. | $Cl_2$, Ft.$^3$/min. | He, Ft.$^3$/min. | Residue, gm. | Percent $F_2$ Residue | Percent $Cl_2$ Residue | H. B., gm. | Gas, gm. |
|---|---|---|---|---|---|---|---|---|---|---|---|---|
| 1 | 600 | 3¼ | $(CF_n)_x$[1] | 25 | 0 | 0.00025 | 0.02 | 24.5 | | | | |
| 2 | 900 | 3¼ | Ex. 1 | 25 | 0 | 0.00025 | 0.02 | Red 21.0 | | | Trace | Trace |
| 3 | 1,100 | ¼ | Ex. 2 | 20 | 0 | 0.00025 | 0.02 | (Explosion) | | | | |

[1] The solid product of Example 3 in Table I.

The results reported in Table II indicate that the novel solid material of this invention is very stable and substantially resists decomposition by chlorine. At about 1100° F. the material did decompose, however, this was due to the temperature and not the presence of chlorine as will be demonstrated hereinafter.

Additional experiments were conducted in which graphite and unleached Norite were used as the carbon reactant. These results are shown in Table III below.

using unleached Norite. These results are given in Table IV below.

TABLE IV

| Ex. No. | Temperature, °F. | Time, Hrs. | Charge | Charge, gm. | $F_2$, Ft.$^3$/min. | $Cl_2$, Ft.$^3$/min. | He, Ft.$^3$/min. | Residue, gm. | Percent F Residue | Percent Cl Residue |
|---|---|---|---|---|---|---|---|---|---|---|
| 1 | 600 | 5 | Leached Norite. | 50 | .005 | .00025 | 0.02 | 81 | 50.9 | 0.34 |
| 2 | 600 | 4½ | Ex. 1 | 80 | .005 | .00025 | 0.02 | 88 | 56.1 | 0.19 |
| 3 | 600 | 5½ | Ex. 2 | 80 | .005 | .00025 | 0.02 | 78 | 61.1 | 0.24 |
| 4 | 600 | 6½ | Ex. 3 | 48 | .005 | .00025 | 0.02 | 65 | 54.6 | 1.1 |
| 5 | 600 | 6 | Ex. 4 | 63 | .005 | .00025 | 0.02 | 65 | 62 | 0.3 |
| 6 | 600 | 5 | Ex. 5 | 62 | .005 | .00025 | 0.02 | 60 | 72.6 | 1.3 |

From Table IV, it can be seen that the leached Norite will combine with substantially more halogen for a given period of operation than is obtained with respect to Norite. Furthermore, as in the case of Norite, the residue undergoes an initial increase in weight, but thereafter the weight remains substantially the same whereas the halogen content continues to increase. The residue of Ex-

TABLE III

| Ex. No. | Temperature, °F. | Time, Hrs. | Charge | Charge, gm. | $F_2$, Ft.$^3$/min. | $Cl_2$, Ft.$^3$/min. | Helium, Ft.$^3$/min. | Residue, gm. | Percent F Residue | Percent Cl Residue |
|---|---|---|---|---|---|---|---|---|---|---|
| 1 | 600 | 5¾ | Graphite[1] | 25 | .005 | .00025 | .02 | 35 | 28.5 | |
| 2 | 600 | 6 | Norite[2] | 75 | .005 | .00025 | .02 | 124 | 33.7 | 0.4 |
| 3 | 600 | 6 | Ex. 2 | 123 | .005 | .00025 | .02 | 123 | 35.0 | 1.3 |
| 4 | 600 | 6 | Ex. 3 | 120 | .005 | .00025 | .02 | 122 | 39.5 | 0.9 |
| 5 | 700 | 6 | Ex. 4 | 119 | .005 | .00025 | .02 | 119 | 48.6 | 1.9 |

[1] Graphite was 40 to 100 mesh size.
[2] Norite is pine charcoal of 40–100 mesh size.

The results in Table III clearly indicate that graphite and Norite can be used as the carbon reactant, although graphite is not as satisfactory as the leached and unleached Norite. It appears that highly sorptive carbon ample 3 which had a fluorine content of 61.1% by weight, was analyzed by X-ray. It was found that this material possessed an amorphous structure.

The change in color of the residue was noted as the halogen content of the solid material increased. These results are reported below in Table V.

TABLE V

| Ex. No. | Temperature, °F. | Time Hrs. | Charge | Charge, gm. | $F_2$, Ft.$^3$/min. | $Cl_2$, Ft.$^3$/min. | He, Ft.$^3$/min. | Residue, gm. | Percent F Residue | Percent Cl Residue | Color of Residue |
|---|---|---|---|---|---|---|---|---|---|---|---|
| 1 | 400–450 | 6 | Norite[1] | 50 | 0.005 | .00025 | .02 | 72 | 45 | 1.4 | Black. |
| 2 | 300–450 | 6 | Ex. 1 | 71 | 0.005 | .00025 | .02 | 84 | 54.6 | 0.9 | Brown-Black. |
| 3 | 300 | 6 | Ex. 2 | 80 | 0.005 | .00025 | .02 | 80 | 61.1 | 0.6 | Do. |
| 4 | 400 | 6 | Ex. 3 | 78 | 0.005 | .00025 | .02 | 84 | 69.3 | 0.4 | Grey. |
| 5 | 500 | 6 | Ex. 4 | 83 | 0.005 | .00025 | .02 | 83 | | | Grey-White. |
| 6 | 600 | 6 | Ex. 5 | 80 | 0.005 | .00025 | .02 | 75 | 72.1 | 0.3 | White. |
| 7 | 600 | 6 | Ex. 6 | 72 | 0.005 | .00025 | .02 | 70 | 73.5 | 0.3 | Do. |
| 8 | 600 | 6 | Ex. 7 | 68 | 0.005 | .00025 | .02 | 66 | 77.9 | 0.2 | Perfectly White. |
| 9 | 600 | 6 | Ex. 8 | 63 | 0.005 | .00025 | .02 | 62 | 79.2 | 0.2 | Do. |

[1] Unleached Norite of 40–100 mesh size.

The results in Table V clearly indicate the change in color of the residue as the concentration of combined halogen increases. By X-ray analysis, the solid material containing 79.2 wt. percent fluorine was found to contain a definite crystalline structure. On the other hand, the residue or solid of Example 2 was found to be amorphous by X-ray analysis. Therefore, it appears that once the residue reaches a fluorine content of about 61% by weight, further treatment with the reactant gases effects a rearrangement in the residue which changes the solid from an amorphous structure to a crystalline structure. This rearrangement is accompanied by an increase in fluorine content and what appears to be a slight loss in total weight of the residue, or perhaps the total weight remains constant.

The properties of a sample of solid material, viz., Example 8 of Table V were determined for the purpose of establishing uses and the limits thereof. These properties are tabulated below:

The solid is a white, odorless, friable material resembling talc in appearance.

The material does not appear to possess a melting point or a boiling point.

The solid decomposed with a sooty flame at about 500° C. with the liberation of carbon, carbon tetrafluoride and minor amounts of higher halocarbons. The same manner of decomposition took place in the air and in a vacuum.

The solid is not wet by water, but it is wet by oxygenated organic compounds, viz., acetone, ethyl ether, ethanol, acetic acid, nitrobenzene and phenol; by hydrocarbons, viz., benzene, xylenes, cyclohexane, petroleum ether, and Nujol; by halogenated organic compounds, viz., carbon tetrachloride, trichloromethane, trifluoroacetic acid, mono-iodobutane; and by other compounds, viz., butyl ether, tributyl amine, and perfluoroheptane ($C_7H_{16}$).

The solid material is insoluble in all solvent whether cold or hot. The solvents tested were acetic acid, trifluoroacetic acid, ethanol, acetone, nitrobenzene, carbon tetrachloride, iodobutane, benzene, $C_7F_{16}$, "Nujol," and 1,1,1-trichloropentafluorobutane.

The solid does not react significantly with boiling solutions of (1) 20% KOH, (2) 10% $KMnO_4$, and (3) 10% potassium dichromate, and (4) cold 10% silver nitrate.

The solid was inert and insoluble in boiling solutions of sulfuric acid, nitric acid, potassium dichromate, acetic acid, and aqua regia.

Reacts with sodium carbonate by fusion to form NaF.

Halogen, e. g., fluorine, can be removed from the solid by refluxing same in one normal solution of ethanolic sodium ethoxide.

The solid is infusible and it cannot be molded at 370° C. and 10,000 psi.

The solid is inert when refluxed with aqueous and alcoholic solutions of KOH and $Na_2CO_3$.

The solid decomposed slowly to gaseous products when fused with $ZnCl_2$.

Another outstanding characteristic of our invention is the preparation of a crystalline solid material from amorphous carbon. Under the circumstances, it was expected that the solid material would remain amorphous when using amorphous carbon as the starting material. The opposite result was obtained as is shown in Table V, where Norite, an amorphous carbon material, was employed as the starting material. Further, the use of a highly sorptive carbon material appears to facilitate the reaction with fluorine to a greater extent than the less sorptive or non-sorptive carbon material. Another interesting feature of the data shown above is that the fluorine content of the solid product increased above the amount required for the production of a material having a 1.5 to 1 atomic ratio of fluorine to carbon, which represents a solid containing 70.5% by weight of fluorine. This is illustrated by the production of a solid containing 79.2% by weight of fluorine which corresponds to a solid having approximately a 2.5 to 1 atomic ratio of fluorine to carbon. The production of solid products containing a fluorine content greater than what corresponds to an atomic ratio of fluorine to carbon in the order of about 1.5 to 2.0:1, demonstrates the effectiveness of this invention.

Having thus provided a description of our invention along with specific examples, it should be understood that no undue limitations or restrictions are to be imposed by reason thereof, but that the scope of our invention is measured by the appended claims.

We claim:

1. A method for preparing a solid composition containing a polymer having the unit formula $(CF_n)_x$ where $n$ is equal to from 1 to 2.5 which is insoluble in organic solvents comprising reacting fluorine with carbon in the presence of a different halogen in the proportion of 10 to 20 of fluorine to 1 of the other halogen and a catalyst selected from the group of halides of metals of groups I, II, and VIII for 5 to 10 hours at a temperature of 200° to 400° F. and continuing the reaction at a temperature of 500 to 700° F. until said solid composition is obtained.

2. A solid polymer composition which is insoluble in organic solvents having the unit formula $(CF_n)_x$ and containing above about 61 weight percent of fluorine prepared by the process of claim 1.

3. A solid amorphous polymer composition which is insoluble in organic solvents having the unit formula $(CF_n)_x$ and containing about 61 percent by weight of fluorine prepared by the process of claim 1.

4. A solid crystalline polymer composition which is insoluble in organic solvents having the unit formula $(CF_n)_x$ and containing about 79 percent by weight of fluorine prepared by the process of claim 1.

References Cited in the file of this patent

UNITED STATES PATENTS

| | | |
|---|---|---|
| 2,456,027 | Simons | Dec. 14, 1948 |
| 2,456,028 | Simms | Dec. 14, 1948 |
| 2,497,046 | Kropa | Feb. 7, 1950 |
| 2,522,968 | Simons | Sept. 19, 1950 |
| 2,546,997 | Gochenour | Apr. 3, 1951 |
| 2,549,580 | Denison et al. | Apr. 17, 1951 |
| 2,670,389 | Passino et al. | Feb. 23, 1954 |

OTHER REFERENCES

Ruff et al.: Z. anorg. allgem. Chem., vol. 217, pages 1–19 (1934).

Simons: Flourine Chemistry, pages 377–380 (1950).

Simons: Fluorine Chemistry, pages 536–546 (1950).

Slesser et al.: Preparation Properties and Technology of Fluorine and Organic Fluoro Compounds, page 350 (1951).

Cristoffers et al.: J. Am. Chem. Soc., vol. 69, pages 2502–2504 (October 1947).